US008820798B2

(12) United States Patent
Campfort et al.

(10) Patent No.: US 8,820,798 B2
(45) Date of Patent: Sep. 2, 2014

(54) INTERFACIAL SEAL WITH A GROOVE

(75) Inventors: Christian Campfort, Fresnay le Gilmert (FR); Sebastien Charvet, Elancourt (FR)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 0 days.

(21) Appl. No.: 13/637,676

(22) PCT Filed: Mar. 29, 2010

(86) PCT No.: PCT/IB2010/001264
§ 371 (c)(1),
(2), (4) Date: Jan. 9, 2013

(87) PCT Pub. No.: WO2011/121380
PCT Pub. Date: Oct. 6, 2011

(65) Prior Publication Data
US 2013/0200577 A1    Aug. 8, 2013

(51) Int. Cl.
*F16L 21/00*    (2006.01)
(52) U.S. Cl.
USPC .......................................... 285/331; 277/609
(58) Field of Classification Search
USPC .......... 285/336, 331, 328, 374; 277/608, 609, 277/616
See application file for complete search history.

(56) References Cited

U.S. PATENT DOCUMENTS

| | | | | |
|---|---|---|---|---|
| 1,906,826 | A | * | 5/1933 | Smith et al. .................... 285/331 |
| 2,050,137 | A | * | 8/1936 | Walsh ............................ 285/331 |
| 3,820,830 | A | * | 6/1974 | Dryer ............................. 285/336 |
| 5,466,018 | A | * | 11/1995 | Stobbart ..................... 285/334.2 |
| 5,549,583 | A | * | 8/1996 | Sanford et al. ................ 604/535 |
| 2006/0220326 | A1 | * | 10/2006 | Leadley-Brown et al. ... 277/609 |

FOREIGN PATENT DOCUMENTS

| | | |
|---|---|---|
| DE | 195 48 069 | 7/1996 |
| FR | 2 731 559 | 9/1996 |
| FR | 2 604 566 | 4/1998 |
| WO | WO 2008/012099 A1 | 1/2008 |

* cited by examiner

*Primary Examiner* — Aaron Dunwoody
(74) *Attorney, Agent, or Firm* — Robert J. Myers

(57) ABSTRACT

A ring-shaped interfacial seal for a connector assembly includes an internal radial surface, inward oriented, surrounding a sealing surface of a connector, an external radial surface, outward oriented, surrounded by a second sealing surface, opposed top and bottom surfaces, and a groove in the bottom surface. The groove receives a sealing ring of a second connector. An internal sealing portion of the seal, located between the groove and the internal surface, and/or an external sealing portion of the seal, located between the groove and the external surface, is compressed radially.

9 Claims, 4 Drawing Sheets

INTERFACIAL SEAL WITH A GROOVE

FIELD OF THE INVENTION

The invention relates to seals for connectors, in particular electrical, optical or opto-electrical connectors for example, and to systems, assemblies and connectors to be provided with such seals.

BACKGROUND

Connectors are notably used for connecting an electrical, optical or electro-optical apparatus to another, and can be found in any kind of electrical, optical or electro-optical devices. Such connectors can for example be of the type comprising a housing in which electrical wires or optical fibres are inserted. In the present document, electrical connectors are taken as examples, but the one skilled in the art will easily transpose these examples into connectors for optical, electro-optical or other kinds of similar applications.

Since it is undesirable that foreign bodies, such as dust and liquids, penetrate the inside of connectors, it is preferable to seal connectors against such foreign bodies. It has been known to provide a so-called "interfacial" seal, i.e. a seal which is placed between the two connectors to be assembled. Thus, unwanted penetration of material through the interface between the two connectors is prevented.

An example of an interfacial joint is for example shown in WO 2008/012,099.

One critical parameter for the design of a connector assembly is the force necessary to be applied to the connectors for their assembly to one another, (so called "mating force"). When the insertion force is high, there is a risk that it will be difficult to connect the connectors, which might result in mis-connections. Another risk is that too high a force is applied, which might result in damages to the connectors.

It is required to lower the force necessary to connect together the two connectors, however, without negatively affecting their operative performance.

SUMMARY

An interfacial seal for a connector assembly is provided. The seal has the shape of a ring.

The seal comprises an internal radial surface. This surface is inward oriented. It is adapted to surround a first sealing surface of a first connector.

The seal further comprises an external radial surface. That surface is outward oriented. It is adapted to be surrounded by a second sealing surface.

The seal also comprises top and bottom surfaces. These two opposed surfaces link together the internal surface and the external surface.

A groove is provided in the bottom surface. The groove is shaped to receive a sealing ring of a second connector.

When the sealing ring of the second connector is received in the groove of the seal, a sealing portion of the seal is compressed radially. This sealing portion is either an internal sealing portion, located between the groove and the internal surface, or an external sealing portion, located between the groove and the external surface.

With these features, the insertion force is decreased while maintaining an excellent sealing ability.

BRIEF DESCRIPTION OF THE DRAWINGS

Other characteristics and advantages of the invention will readily appear from the following description of one of its embodiments, provided as a non-limitative example, and of the accompanying drawings.

On the drawings.

On the different figures, the same reference signs designate like or similar elements.

DETAILED DESCRIPTION

Figure 1:
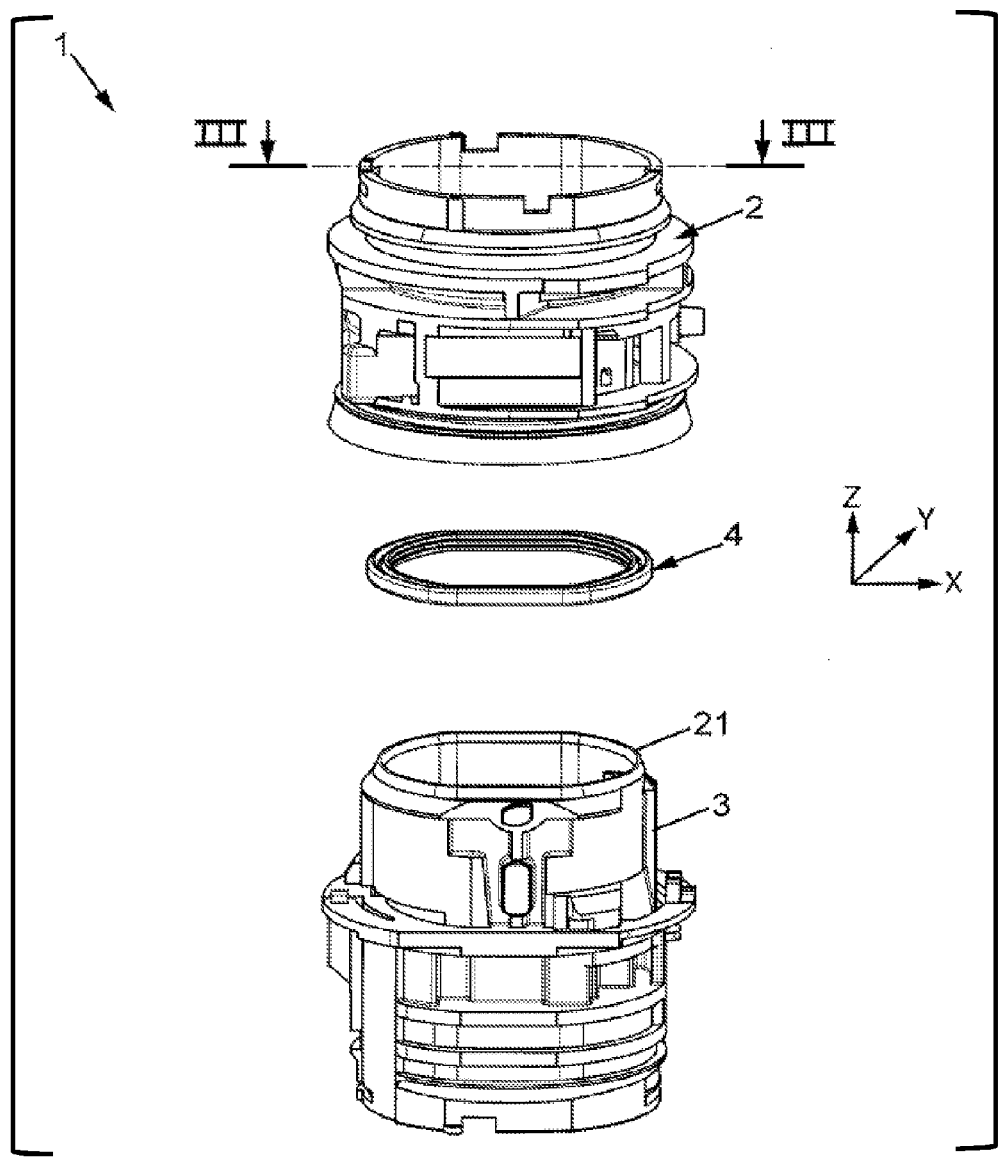
FIG. 1 is a perspective exploded view of a connector assembly.

FIG. 1 shows an example of a connector assembly 1 comprising a first connector 2 and a complementary second connector 3. The first and second connectors 2, 3 can be mated to one another along a mating direction Z.

The directions X and Y define a plane normal to the direction Z. For example, for the present description, the direction X sensibly corresponds to the length, and the direction Y to the width of the connector assembly in the X-Y plane.

Such connectors 2 and 3 are for example electrical connectors comprising a housing holding a plurality of electrical terminals (not shown). The housing, for example, comprises a rigid insulating material which electrically insulates the terminals the ones from the others. For example, as shown on FIG. 3, the housing 2 defines a plurality of receptacles 24 through which electrical terminals extend.

The second connector 3 may have a similar and complementary construction so that, upon mating the first and second connectors 2, 3, the electrical terminals of the respective connectors will connect. Such connection will enable to transmit electrical signals and/or power between electrical devices, each respectively connected to a respective connector 2, 3.

An interfacial seal 4 is provided between the first and second connectors 2, 3. The seal 4 prevents water and/or dust to propagate from the outside, into one or both of the connectors through the interface between them.

Figure 2:
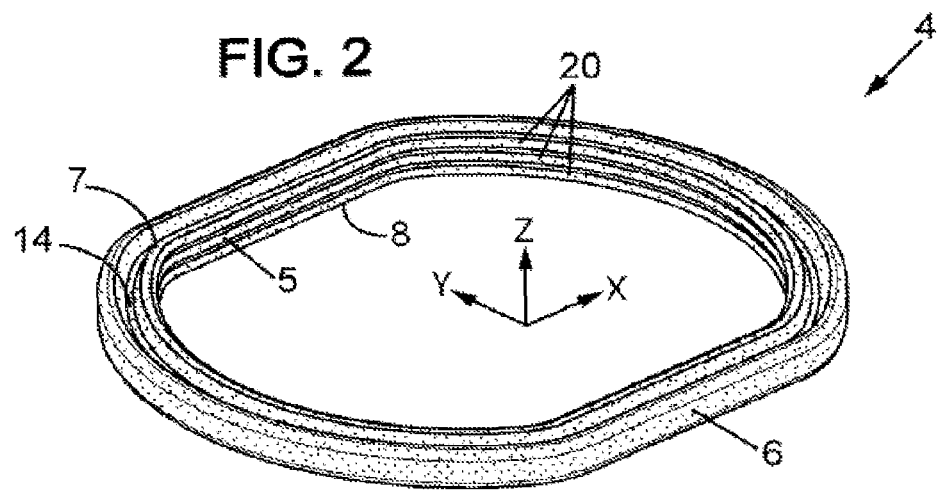
FIG. 2 is a perspective view of a seal.

As can be seen on FIG. 2, the interfacial seal 4 has the shape of a ring. It has an internal radial surface 5 extending circumferentially around the axis Z. The internal radial surface 5 faces radially inward. It has an opposite external radial surface 6, facing radially outward.

The internal radial surface 5 and the external surface radial surface 6 are linked together by a top surface 7 facing toward the first connector 2 and an opposite bottom surface 8, facing toward the second connector 3.

Figure 4:
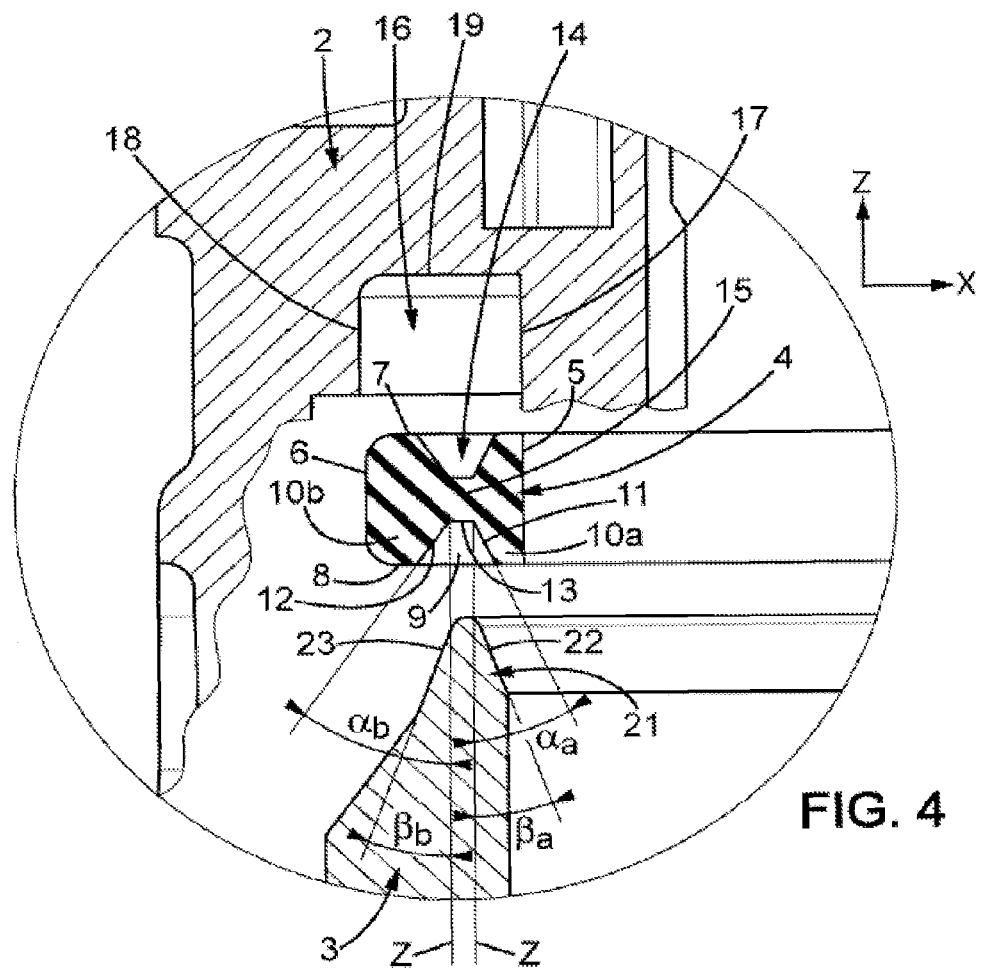
FIG. 4 is an exploded sectional view along line III-III of FIG. 1, of the connector assembly of the FIG. 1.

Turning now to FIG. 4, the bottom surface 8 comprises a groove 9. For example, the groove 9 extends circumferentially along the whole circumference of the seal 4. For example, the groove 9 has a constant cross section all along the periphery of the seal 4. An internal sealing portion 10a is defined as this part of the seal 4 which extends between the groove 9 and the internal radial surface 5.

An external sealing portion 10b is defined as this part of the seal which extends between the groove 9 and the external radial surface 6.

The groove 9 has an internal radial surface 11, facing outward, and an opposed external radial surface 12, facing inward. These surfaces 11 and 12 may for example be connected together through a flat bottom 13.

In the present example, the groove 9 has a tapered cross-section. For example, the internal radial surface 11 of the groove forms an angle $\alpha_a$ with the mating axis Z which is at least equal to five degrees. For example, the external radial surface 12 of the groove forms an angle $\alpha_b$ with the mating direction Z, which is at least equal to five degrees. Both conditions could be satisfied, as shown. In alternative embodiments, only one of these two conditions could be satisfied.

In the present embodiment, the top surface 7 of the seal might also have a groove 14. For example, this groove 14 is similar to the groove 9 of the bottom surface 8. It will be noted that, if such as in the present example, the seal 4 (without taking into account the grooves 9 and 14) is symmetrical with respect to the X-Y plane, then the grooves 9 and 14 may also be provided to be symmetrical with respect to the X-Y plane passing through the middle of the seal. In such case, the seal could be mounted in the connector assembly either in the regular orientation, or upside down. This would be beneficial for the mounting, since there would not be any need to check for the correct orientation of the seal with respect to the X-Y plane, provided the connectors to be sealed show sufficient symmetry (which is often the case for connectors).

In cases, such as the present example, where the seal comprises both a groove 9 in the bottom surface 8 and a groove 14 in the top surface 7, a thin flexible rib or flange 15 interconnects together the internal sealing portion 10a and the external sealing portion 10b of the seal. With this flexible rib 15, the external sealing portion 10b can be made to rotate with respect to the internal sealing portion 10a. In the cross-section shown on FIG. 4, this rotation is allowed about the axis Y (obviously, in another section of the seal, normal to the section of FIG. 4, this rotation would be allowed about the axis X).

The seal 4 is, for example, made from an elastomer material, such as a material having a hardness between 20 and 60 shore A, preferably between 40 and 55 shore A, such as, for example, a suitable liquid silicone rubber material.

Figure 3:
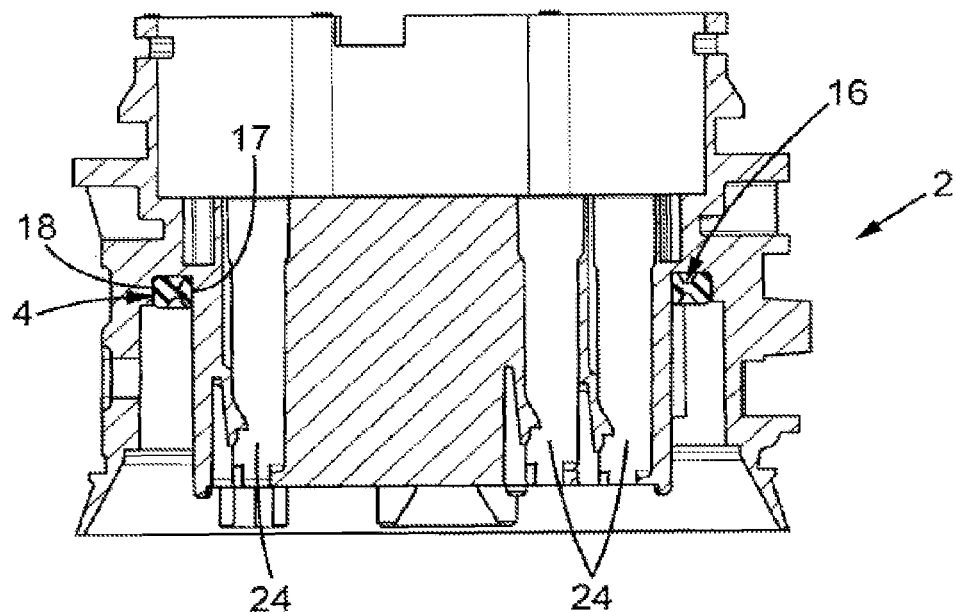
FIG. 3 is a sectional view along line III-III of FIG. 1 of a system comprising a first connector and a seal.

As it is visible on FIG. 3, the seal 4 is mounted in a circumferential groove 16 of the first connector 2. In particular, as shown on FIG. 4, the first connector 2 comprises a first sealing surface 17, provided as an internal radial surface facing radially outward, and which is surrounded by the internal radial surface 5 of the seal 4. Opposed to the first sealing surface 17, the first connector 2 comprises a second sealing surface 18, which is provided as an external radial surface facing radially inward and designed to surround the external radial surface 6 of the seal 4.

In the present example, the first and second sealing surfaces 17 and 18 of the first connector 2 are provided in a given integral part of the first connector 2, and are connected together by a bottom surface 19 which faces the top surface 7 of the seal 4 (see FIG. 4). For example, the bottom surface 19 is substantially flat and extends in the X-Y plane.

Alternatively, the sealing surfaces 17, 18 could be provided on distinct components which are firmly attached to one another.

As shown on FIG. 3, during the assembly, the seal 4 is mounted into the groove 16 of the first connector 2, the dimensions of this groove and seal are provided so that this mounting is performed with a low applied force. In this way, the seal 4 is substantially not compressed when it is retained on the first housing 2. For example, this retention is eased by ribs 20 provided on the internal radial surface 5 of the seal as schematically shown on FIG. 2.

Moving back to FIG. 4, the second connector 3 comprises a sealing ring 21 which is shaped so as to be introduced into the groove 9. The sealing ring 21 comprises an internal radial surface 22, facing inward and an opposed external radial surface 23 facing outward. In the present example, the sealing ring 21 and the groove 9 are shaped so that, upon mating of the second connector 3, at least one of the following condition is satisfied:

the internal sealing portion 10a will be compressed radially between the internal radial surface 22 of the sealing ring 21 of the second connector 3 and the first sealing surface 17 of the first connector 2, and/or the external sealing portion 10b of the seal 4 will be compressed radially between the external radial surface 23 of the second connector 3 and the second sealing surface 18 of the first connector 2.

In the present example, both conditions are satisfied. "Radial compression" means that compressive stress is created mainly in the X-Y plane, and in direction of the central axis of the seal 4.

For example, the sealing ring 21 may have a tapered cross-section. In particular, when, such as in the present case, the internal radial surface 11 of the groove is tapered by an angle $\alpha_a$, the corresponding internal radial surface 22 of the sealing ring 21 forms an angle $\beta_a$ with the mating direction Z, which is lower than the angle $\alpha_a$. This would able to compensate for clearances.

In particular, when, such as in the present case, the external radial surface 12 of the groove is tapered by an angle $\alpha_b$, the external radial surface 23 of the sealing ring 21 forms an angle $\beta_b$ with the mating axis Z, which is lower than $\alpha_b$. This would make the insertion of the second connector 3 in the groove 9 easier. This would also enable elongation of the seal.

Figure 5:
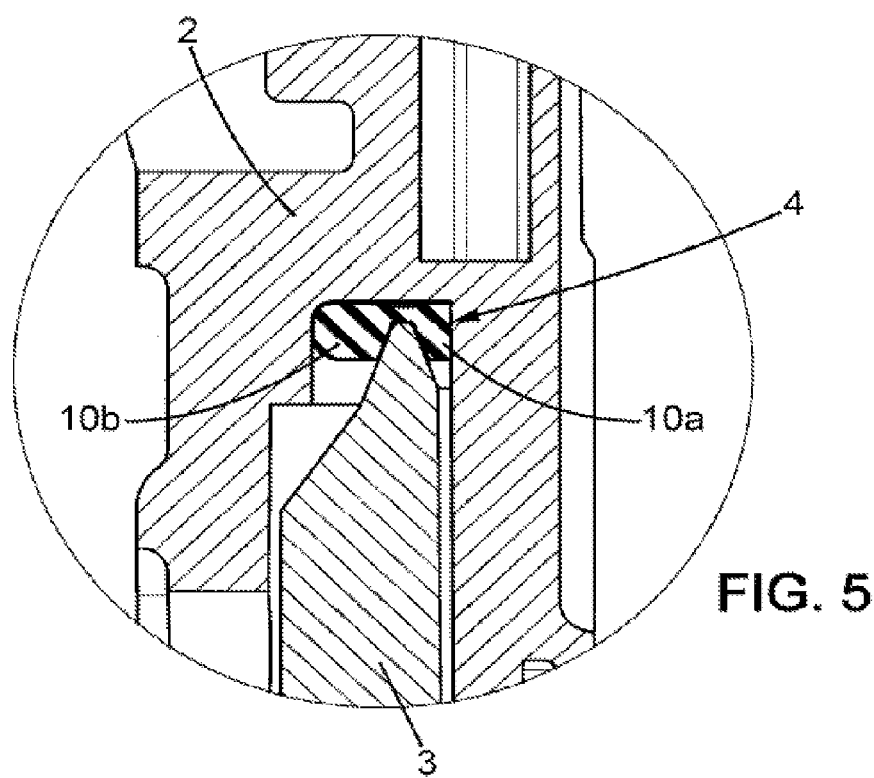
FIG. 5 is an illustrative view corresponding to FIG. 4, in mated condition of the connector assembly.

As it is visible on FIG. 5, when the first and second connector 2 and 3 are mated to one another (usually, a mechanical lock holds tight the first and second connectors together in an assembled position), the seal 4 is compressed between the two connectors (the deformation of the seal 4 on FIG. 5 is purely illustrative. However, it will be understood that a good sealing efficiency is provided by the radial compression of the internal and external sealing portions 10a, 10b. The insertion force of the second connector 3 is low since the seal 4 exerts a low force against the insertion of the connector 3 (opposite to the direction Z). Mainly, the part which is longitudinally (along direction Z) compressed between the connectors 2 and is minimal, and could even be close to zero. In the present example, the central rib 15 is lifted upward without any substantial compression, during insertion.

The invention claimed is:

1. A connector assembly, comprising:
   a first connector defining a ring-shaped connector groove, said connector groove having an outwardly oriented radial first sealing surface and further having an inwardly oriented radial second sealing surface facing the first sealing surface;
   a second connector configured to connect with said first connector along a mating axis and defining a tapered sealing ring, said sealing ring having an inwardly oriented radial surface defining a first angle with respect to the mating axis and an outwardly oriented radial surface defining a second angle with respect to the mating axis;
   a ring-shaped interfacial seal received in the connector groove of the first connector and defined around the mating axis, said seal having:
      an inwardly oriented radial surface and forming an internal sealing portion that surrounds the first sealing surface of the first connector,
      an outwardly oriented radial surface and forming an external sealing portion that is surrounded by the second sealing surface,
      opposed top and bottom surfaces linking the internal sealing portion to the external sealing portion, and a seal groove defined in the bottom surface around the mating axis, said seal groove having a tapered profile and configured to receive the sealing ridge and having a radial outwardly oriented surface defining a third angle with respect to the mating axis and a radial inwardly oriented surface defining a fourth angle with respect to the mating axis, wherein when the sealing ridge is not received within the seal groove, the value of the first angle of the sealing ring is greater than the value of the fourth angle of the seal groove and the value of the second angle of the sealing ring is greater than the value of the third angle of the seal groove, wherein when the sealing ridge is received within the seal groove, the inwardly oriented radial surface of the sealing ring contacts the radial outwardly oriented surface of the seal groove and the outwardly oriented radial surface of the sealing ring contacts the radial inwardly oriented surface of the seal groove, thereby radially compressing the internal sealing portion of the seal against the first sealing surface of the first connector and the external sealing portion of the seal against the second sealing surface of the first connector.

2. The connector assembly according to claim 1, wherein the value of the third angle of the seal groove is at least 5°.

3. The connector assembly according to claim 1, wherein the value of the fourth angle of the seal groove is at least 5°.

4. The connector assembly according to claim 1, wherein the top surface comprises a second seal groove opposed to the seal groove of the bottom surface of the seal.

5. The connector assembly according to claim 4, wherein the seal defines a rib between the seal groove and the second seal groove, thereby enabling rotation of the external sealing portion relative to the internal sealing portion.

6. The connector assembly according to claim 1, wherein the seal is symmetrical with respect to a symmetry plane normal to the mating axis.

7. The connector assembly according to claim 1, wherein the seal is made from an elastomeric material having a hardness value between 20 and 60 on the Shore A scale.

8. The connector assembly according to claim 7, wherein the elastomeric material forming the seal has a hardness value between 45 and 55 on the Shore A scale.

9. The connector assembly according to claim 1, wherein the connector groove is defined around a mating axis and wherein the connector groove defines an opening in the direction of the mating axis.

\* \* \* \* \*